United States Patent [19]
Riggs

[11] Patent Number: 5,867,662
[45] Date of Patent: *Feb. 2, 1999

[54] COMMUNICATIONS DRIVER SUBSYSTEM FOR ENABLING A DIGITAL COMPUTER SYSTEM TO ESTABLISH A COMMUNICATIONS SESSION WITH A REMOTE DEVICE OVER A SELECTED ONE OF A PLURALITY OF DIVERSE COMMUNICATION MEDIA

[75] Inventor: Justin A. Riggs, Litchfield, N.H.

[73] Assignee: Sun Microsystems, Inc., Palo Alto, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 496,985

[22] Filed: Jun. 30, 1995

[51] Int. Cl.$^6$ ...................................................... G06F 17/00
[52] U.S. Cl. ...................................................... 395/200.58
[58] Field of Search ......................... 395/200.02, 200.03, 395/200.09, 200.12, 200.2, 800, 339, 347, 335, 680, 681, 311, 828–858, 892, 893, 200.47, 200.48, 200.49, 200.58

[56] References Cited

U.S. PATENT DOCUMENTS

| 4,665,501 | 5/1987 | Saldin et al. | 395/828 |
| 4,873,643 | 10/1989 | Powell et al. | 364/468.09 |
| 5,283,861 | 2/1994 | Dangler et al. | 395/339 |
| 5,485,570 | 1/1996 | Busboom et al. | 395/329 |
| 5,553,241 | 9/1996 | Shirakihara | 395/200.12 |

*Primary Examiner*—Ellis B. Ramirez
*Attorney, Agent, or Firm*—Richard A. Jordan

[57] ABSTRACT

A communications driver is provided for establishing communications sessions between a computer system and a remote device, such as another computer system. The computer system includes a plurality of ports which are connected to a number of diverse types of communications media. At least one of the ports comprises a network port controlled by a network socket driver, so that the communications driver can be used in connection with lower-level networking drivers which may be provided by a variety of manufacturers. The communications driver selectively establishes a communications session such that the computer system will operate as a terminal with the remote device over one of the communications media, as selected by an operator. The communications driver initially enables the operator to identify a communications medium and a remote device, and the driver thereafter selects one of the ports in response to identification by the operator of a communications medium and a remote device. After selecting the port, the driver attempts to establish a communications session with the remote device over the communications medium using the port as selected by said communications path selection element. If successful in establishing the communications session, the communications driver enables communications to proceed such that the computer system will operate as a terminal on the remote device, regardless of the communications media over which they communicate.

4 Claims, 7 Drawing Sheets

COMMUNICATIONS DRIVER SUBSYSTEM FOR ENABLING A DIGITAL COMPUTER SYSTEM TO ESTABLISH A COMMUNICATIONS SESSION WITH A REMOTE DEVICE OVER A SELECTED ONE OF A PLURALITY OF DIVERSE COMMUNICATION MEDIA

FIELD OF THE INVENTION

The invention relates generally to the field of digital computer systems and more specifically to arrangements for controlling communications among digital computer systems which may communicate over a plurality of diverse types of communications media using a variety of driver programs. In particular, the invention provides an arrangement by which a computer system, utilizing a terminal program, can selectively communicate over a variety of communications media, in one embodiment over a network through a network port using a variety of networking driver programs, or over communications media such as the public telephony system through a communications ("COM") port.

BACKGROUND OF THE INVENTION

In modern "enterprise" computing, personal computers and workstations distributed among workers in the enterprise are replacing the previously-used large and expensive, centrally-located and maintained mainframe computer systems. One advantage that mainframe systems have over more modern distributed arrangements, however, is that, since they are centrally-located, they more easily provide for sharing of data and programs, which can be important in an enterprise environment. To facilitate program and data sharing among personal computers and workstations, networks have been developed over which one personal computer or workstation can make use of data and programs on another "remote" device, in general by causing the data and programs to be "downloaded," that is, transferred to it for processing. In addition, a personal computer or workstation can, typically over a communications medium such as the public telephony system, engage in a communications session with another remote device in which it effectively operates as a terminal on the remote device, enabling the remote device to process programs using data input that it provides.

SUMMARY OF THE INVENTION

The invention provides a new and improved communications driver arrangement for selectively directing communications in connection with terminal operations over one of a number of diverse types of communications media, including, for example, a network using a variety of networking driver programs and the public telephony system, as selected by an operator.

In brief summary, a communications driver is provided for establishing communications sessions between a computer system and a remote device, such as another computer system. The computer system includes a plurality of ports which are connected to a number of diverse types of communications media. At least one of the ports comprises a network port controlled by a network socket driver, so that the communications driver can be used in connection with lower-level networking drivers which may be provided by a variety of manufacturers. The communications driver selectively establishes a communications session such that the computer system will operate as a terminal with the remote device over one of said communications media. The communications driver initially enables the operator to identify a communications medium and a remote device, and the driver thereafter selects one of the ports in response to identification by the operator of a communications medium and a remote device. After selecting the port, the driver attempts to establish a communications session with the remote device over the communications medium using the port as selected by said communications path selection element. If successful in establishing the communications session, the communications driver enables communications to proceed such that the computer system will operate as a terminal on the remote device, regardless of the communications media over which they communicate.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
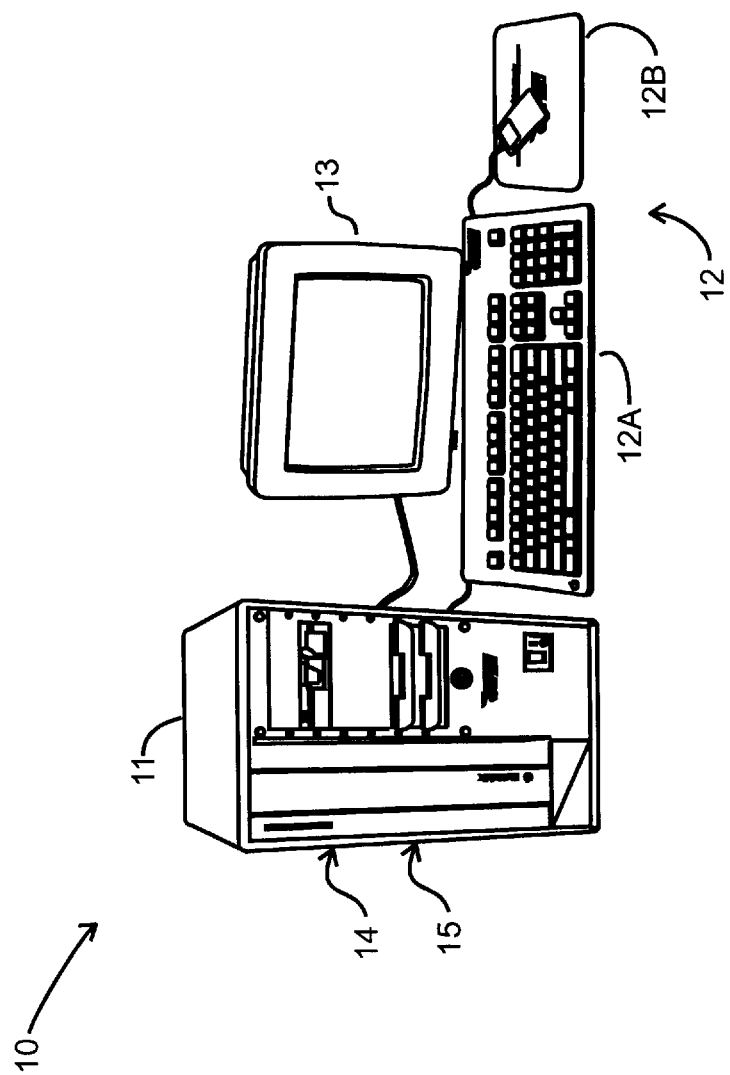
FIG. 1 depicts an illustrative computer system incorporating a communications driver arrangement in accordance with the invention.

FIG. 1 depicts an illustrative computer system 10 constructed in accordance with the invention. With reference to FIG. 1, the computer system 10 in one embodiment includes a processor module 11 and operator interface elements comprising operator input components such as a keyboard 12A and/or a mouse 12B (generally identified as operator input element(s) 12) and an operator output element such as a video display device 13. The illustrative computer system 10 is of the conventional stored-program computer architecture. The processor module 11 includes, for example, processor, memory and mass storage devices such as disk and/or tape storage elements (not separately shown) which perform processing and storage operations in connection with digital data provided thereto. The operator input element(s) 12 are provided to permit an operator to input information for processing. The video display device 13 is provided to display output information generated by the processor module 11 on a screen 14 to the operator, including data that the operator may input for processing, information that the operator may input to control processing, as well as information generated during processing. The processor module 11 generates information for display by the video display device 13 using a so-called "graphical user interface" ("GUI"), in which information for various applications programs is displayed using various "windows." Although the computer system 10 is shown as comprising particular components, such as the keyboard 12A and mouse 12B for receiving input information from an operator, and a video display device 13 for displaying output information to the operator, it will be appreciated that the computer system 10 may include a variety of components in addition to or instead of those depicted in FIG. 1.

In addition, the processor module 11 includes one or more network ports, generally identified by reference numeral 14, which are connected to communication links which connect the computer system 10 in a computer network, and to one or more communications ports, identified by reference numeral 15, which connect the computer system 10 to other computer systems (not shown) over, for example, the public telephony system. The network ports enable the computer system 10 to transmit information to, and receive information from, other computer systems and other devices in the network. In a typical network organized according to, for example, the client-server paradigm, certain computer systems in the network are designated as servers, which store data and programs (generally, "information") for processing by the other, client computer systems, thereby to enable the client computer systems to conveniently share the information. A client computer system which needs access to information maintained by a particular server will enable the server to download the information to it over the network. After processing the data, the client computer system may also return the processed data to the server for storage. In addition to computer systems (including the above-described servers and clients), a network may also include, for example, printers and facsimile devices, digital audio or video storage and distribution devices, and the like, which may be shared among the various computer systems connected in the network. The communication links interconnecting the computer systems in the network 10 may, as is conventional, comprise any convenient information-carrying medium, including wires, optical fibers or other media for carrying signals among the computer systems. Computer systems transfer information over the network by means of messages transferred over the communication links, with each message including information and an identifier identifying the device to receive the message.

The communications ports 15 also enable the computer system 10 to connect to another computer system or other device over a communications medium, which may also be a wire, optical fiber or other signal-carrying medium, or a communications system such as the public telephony system. A communications port 15 may connect directly to a communications port of another computer system. Alternatively, a port 15 may be connected to a modem (modulator/demodulator) which converts digital signals provided by the computer system 10 into audio signals for transmission over the public telephony system for transmission to another computer system, and further converts audio signals received from the public telephony system into digital signals to be provided to the computer system 10. Communications ports 15 are used to facilitate transfer of files between the computer system 10 and another computer system (that is, the other computer system connected to the communications medium over which the computer system 10 is communicating). In addition, communications ports 15 are used to enable the computer system 10 to operate as a terminal on the other computer system, that is, the computer system 10 effectively operates as the operator input and display devices for a program that is being executed on the other computer system. That is, while operating as a terminal, the computer system 10 effectively transfers the operator's inputs through the keyboard 12A, mouse 12B, or other operator input element, to the other computer system through their respective communications ports, and the receiving computer system will recognize and use the information it receives through its communications port as an operator's input, just as it would operator input that it might receive through its own keyboard or mouse. Similarly, any operator output, such as a visual display output that it might generate for display on its own video display device, will be redirected through its communications port for transfer to the computer system 10, which will display the video output on its video display device. During a session involving communications through respective communications ports, that is, while two computer systems are transferring files through their communications ports or while one computer system is operating as a terminal on another computer system, the computer systems are effectively directly connected to each other and to no other computer system, and so they need only transfer information therebetween, without any necessity of transmitting identifiers or the like to identify the intended recipient of the information.

The invention provides an arrangement whereby computer system 10, which may be connected to both a network through a network port 14 and another computer system through a communications port 15, may selectively operate as a terminal in a connection with another "remote" computer system using either the communications port 15, using a communications port driver as described below, or the network port 14, using a variety of conventional networking drivers as described below. That is, the invention provides an arrangement, in the form of a communications driver 20 (FIG. 2) which may be used in conjunction with an applications program (in particular a terminal program) generally identified by reference numeral 21, a communications port driver 22 and a network socket driver 23, by which an operator using the terminal program can select to connect to another "remote" computer system or other device (generally "computer system") through a communications port 15 or a network port 14. If the operator selects to connect to the computer system through a communications port 15, the communications driver directs communications through the communications port 15 in a conventional manner. On the other hand, if the operator selects to connect to the computer system through a network port 14, the communications driver will direct communications through the network port 14.

Figure 2:
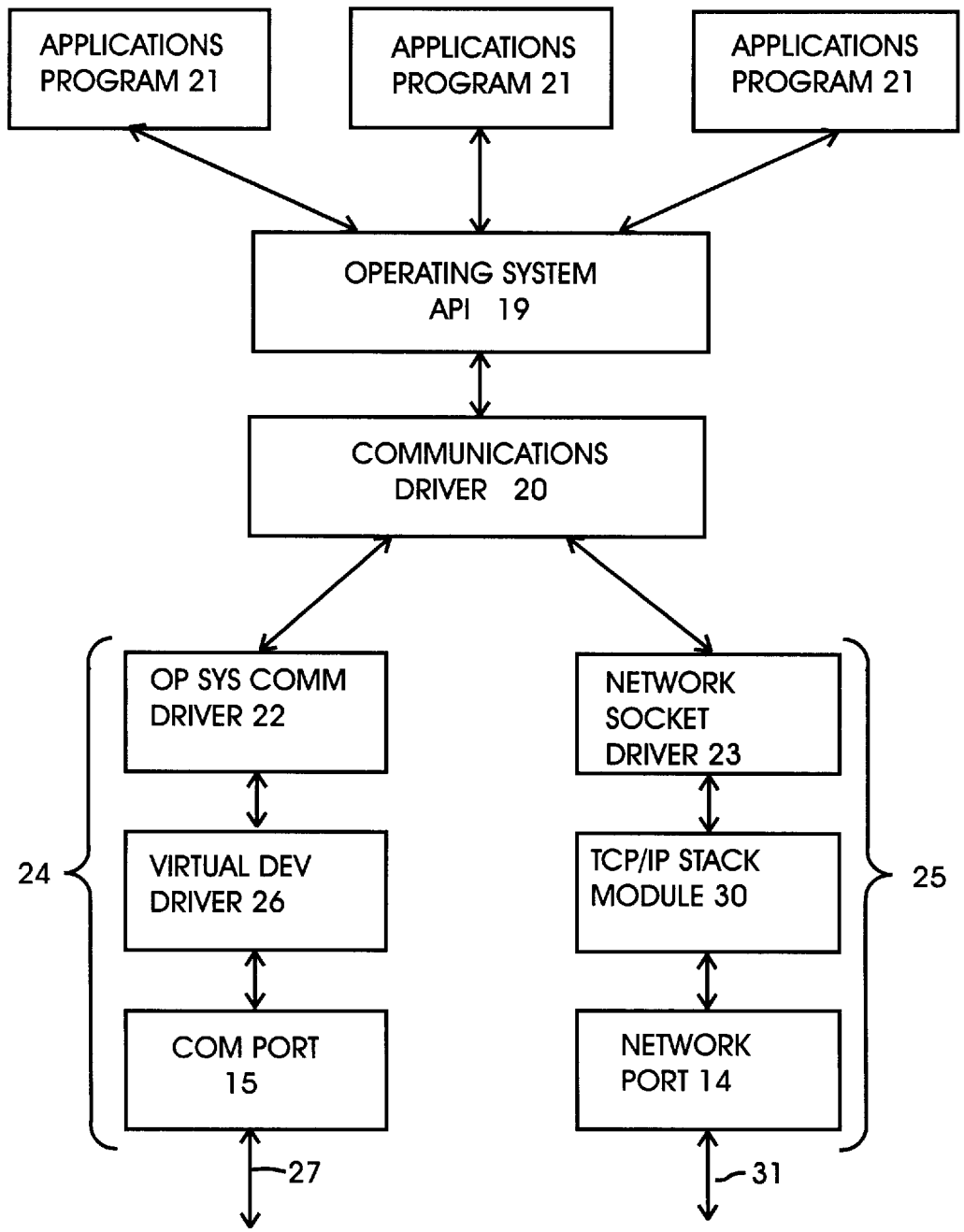
FIG. 2 schematically represents a functional block diagram of the communications driver in relation to other elements of the computer system depicted in FIG. 1.

FIG. 2 depicts a functional block diagram of an arrangement, including the communications driver 20, in accordance with the invention. With reference to FIG. 2, the applications programs 21, illustratively terminal programs, will initiate a communications session by making appropriate calls through the operating system's applications programming interface ("API") 22, which, in turn, transfers the calls to the communications driver 20. The communications driver 20, in response to calls from the API 22, will enable the video display device 13 to display a dialog box, which will be described below in connection with FIG. 3, to the operator to enable the operator to select the port 14 or 15 to be used in connection with the communications session, and if network port 14 is selected to further select the particular computer system or other device with which communications are to be held. The communications driver 20 will receive the responses from the operator, and in response will select either a communications path 24 or a network path 25 to handle communications for the session. In particular, if the operator select the communications port 15, the communications driver 20 will select the communications path 24 for communications during the session, and if the operator selects the network port 14, the communications driver 20 will select the network path 25 for communications during the session.

In one embodiment, the communications path 25 includes the operating system program's communications driver 22, a virtual device driver 26 and the communications port 15. In one embodiment, in which the computer system's operating system program is the Microsoft Windows™ operating system program ("Windows"), the operating system program communications driver 22 handles communications through the communications port 15 for Windows applications programs. By way of background, Windows provides a "virtual machine" operating environment in which a number of applications programs can be executed contemporaneously in a cooperative, non-preemptive manner, so-called "cooperative multi-tasking." The virtual machine environment also permits other applications programs, written for other operating system programs, in particular Microsoft's MS-DOS operating system, to be processed concurrently with processing of the Windows applications programs. The communications port 15, however, may be used for communications with only one applications program at a time, and the virtual device driver 26 identifies and resolves conflicts among applications programs which may wish to use the communications port 15 concurrently.

Accordingly, the operating system program's communications driver 22 and the virtual device driver 26 effectively cooperate to enable the communications driver 20 to utilize the communications port 15. Thus, for example, if the virtual device driver 26 determines that the communications driver 20 is to be permitted to use the communications port 15, the communications driver 22 and the virtual device driver 26 will enable information provided by the communications driver 20 to be transferred to appropriate transmit registers (not shown) in the communications port, which generates signals for transmission over a communication link 27 connected thereto. In addition, the communications driver 22 and viral device driver 26 cooperate to transfer information in receive registers (also not shown) maintained by the communications port 15, which the communications port 15 generates in response to signals that it receives over the communication link 27, to be transferred to the communications driver 20 for transfer to the applications program 21.

In the same embodiment, the network path 25 includes the network socket driver 23, a TCP/IP stack module 30 and the network port 14. In one embodiment, the network socket driver 23 provides network services in the form of a "socket," which is a well-known structure for facilitating communications between pairs of computer systems in a network (see, for example, A. Tanenbaum, *Computer Networks*, 2d Ed. (Prentice-Hall, 1988), pp. 434–435), in particular the well-known WinSock driver. A socket facilitates communications over a network between two computer systems connected to the network, including handling addressing, message buffering, message flow control, and so forth, to facilitate transfer of messages between pairs of computer systems for particular programs being processed by those computer systems, and provides a uniform interface to which various manufacturer's TCP/IP stack module 30 can interface. Accordingly, by providing the network socket driver 23 as an interface between the communications driver 20 and the TCP/IP stack module 30, the communications driver 20 can be used in connection with a number of manufacturer's TCP/IP stack modules. In any case, when one applications program on one computer system has information to be transferred to another applications program on another "remote" computer system, a socket arrangement will ensure that the transmitting computer system will provide a message for the information which identifies the computer system as the intended recipient, and further that the message will identify the other applications program as the intended recipient of the information contained in the message.

The TCP/IP stack module 30 provides conventional TCP/IP services in connection with information provided thereto by the network socket driver 23 to be transmitted by the network port 14, and also in connection with messages received by the network port 14. The network port 14 transmits messages over the network communication links generally identified by reference numeral 31 and also receives messages from the network communication links 31 which were transmitted by other devices connected in the network. The network port 14 will determine from the addresses in the message whether the intended recipient for the message is the computer system 10, and if so it will pass the message to the TCP/IP stack module 30 for further handling.

Figure 3:
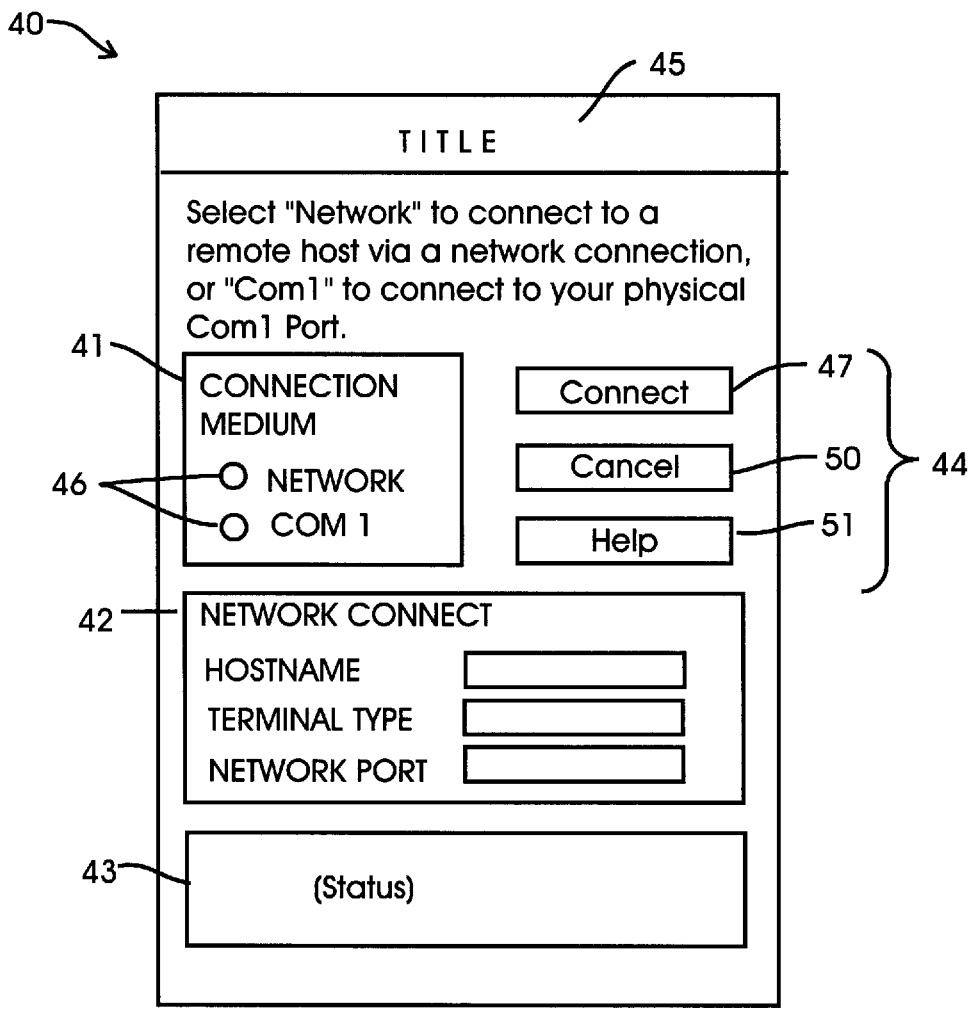
FIG. 3 depicts a dialog box displayed by the communications driver identifying various types of information provided by the operator when communications is initiated by an operator using the communications driver.
Figure 4A:
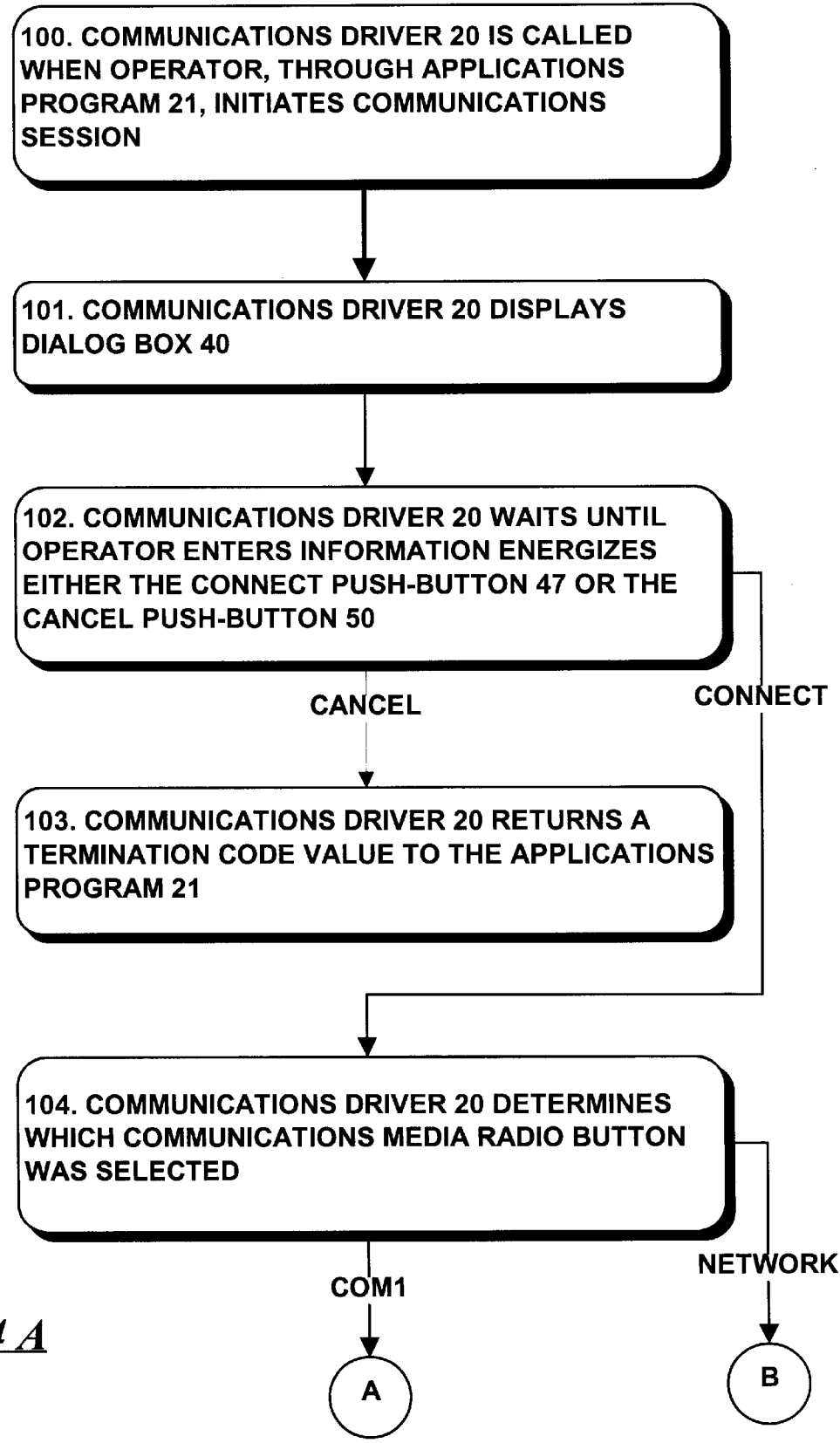
FIGS. 4A through 4D together comprise a flow chart depicting operations performed by the communications driver in selectively establishing communications as selected by the operator through the dialog box depicted in FIG. 3.
Figure 4B:
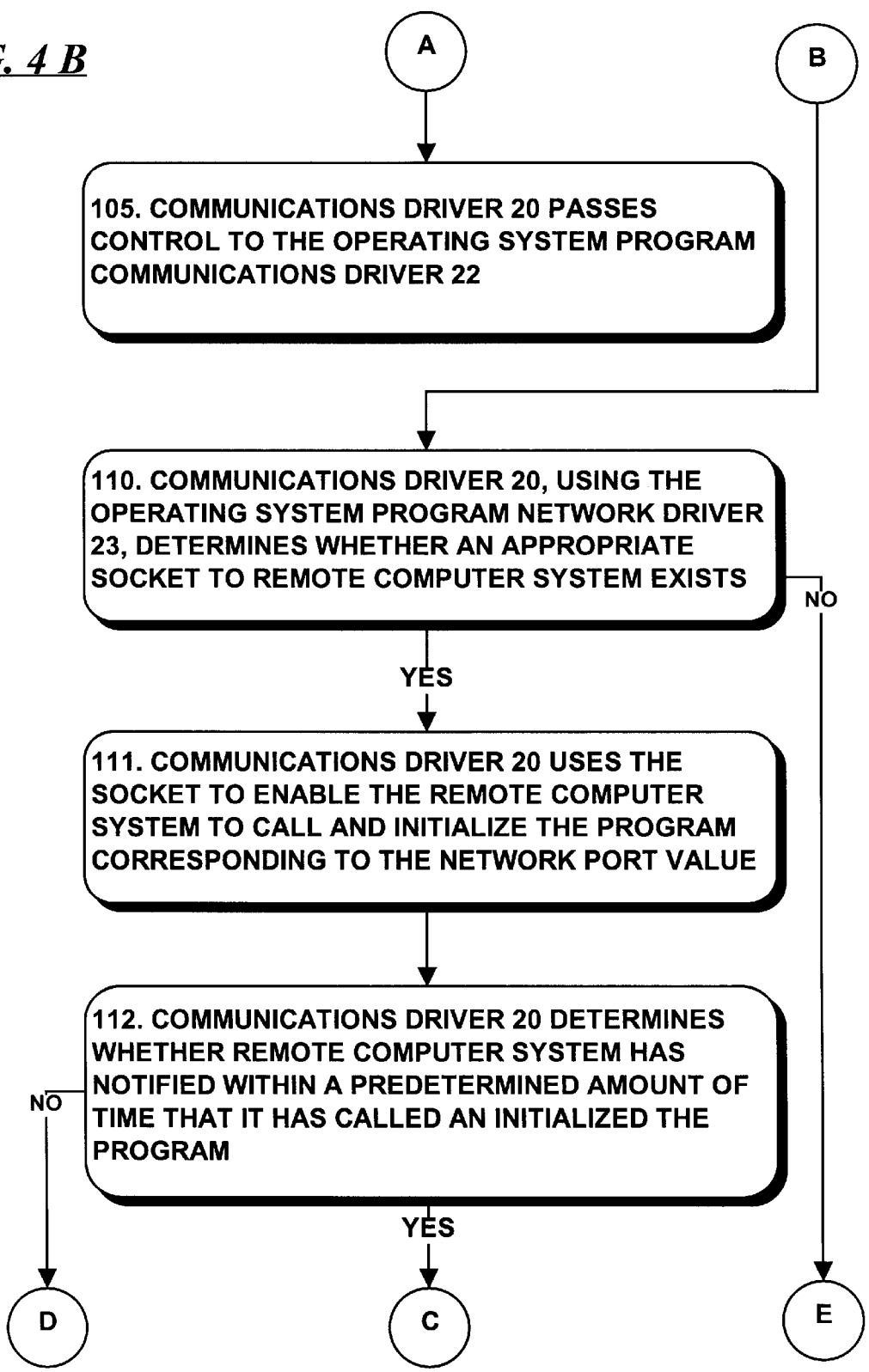
Figure 4C:
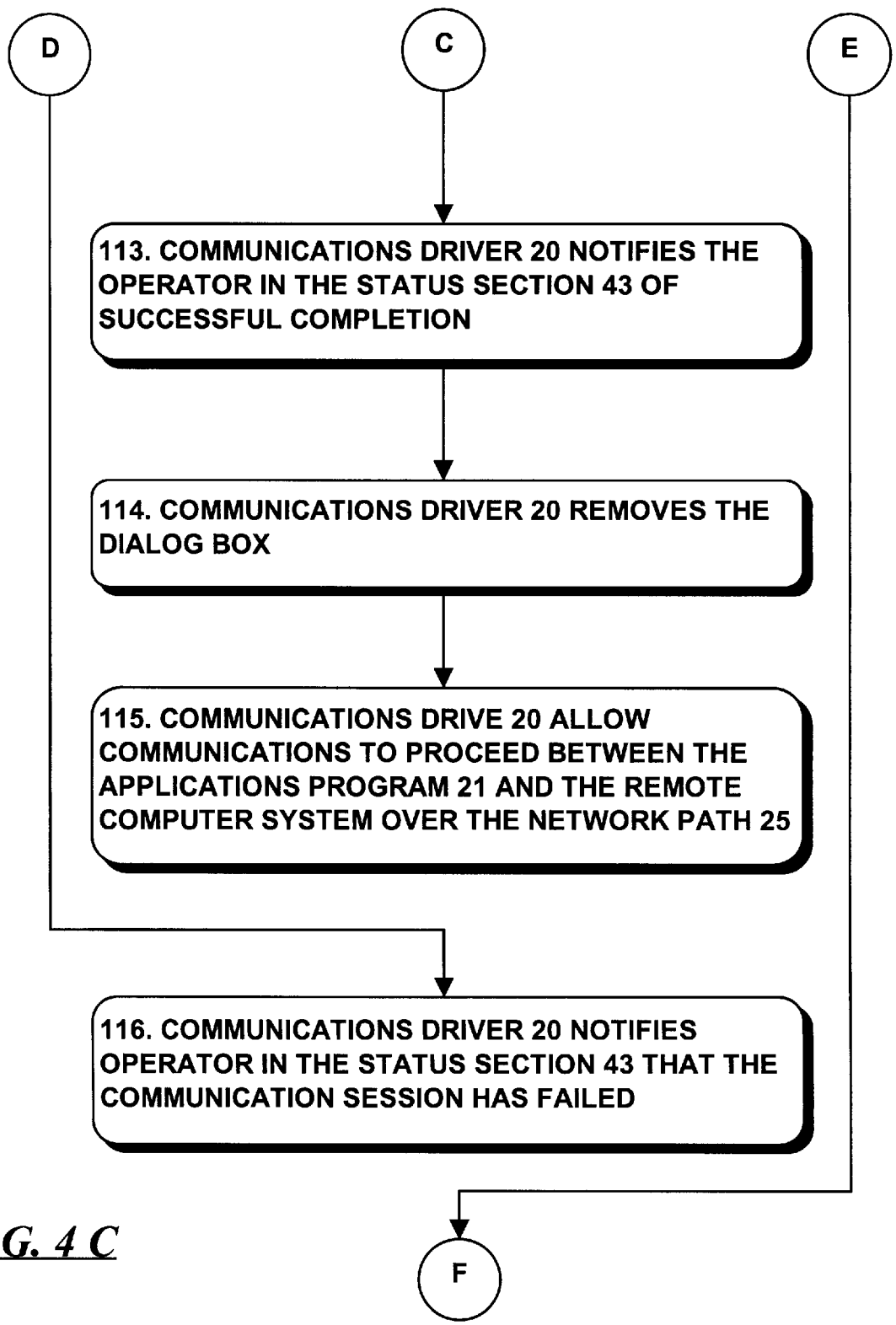
Figure 4D:
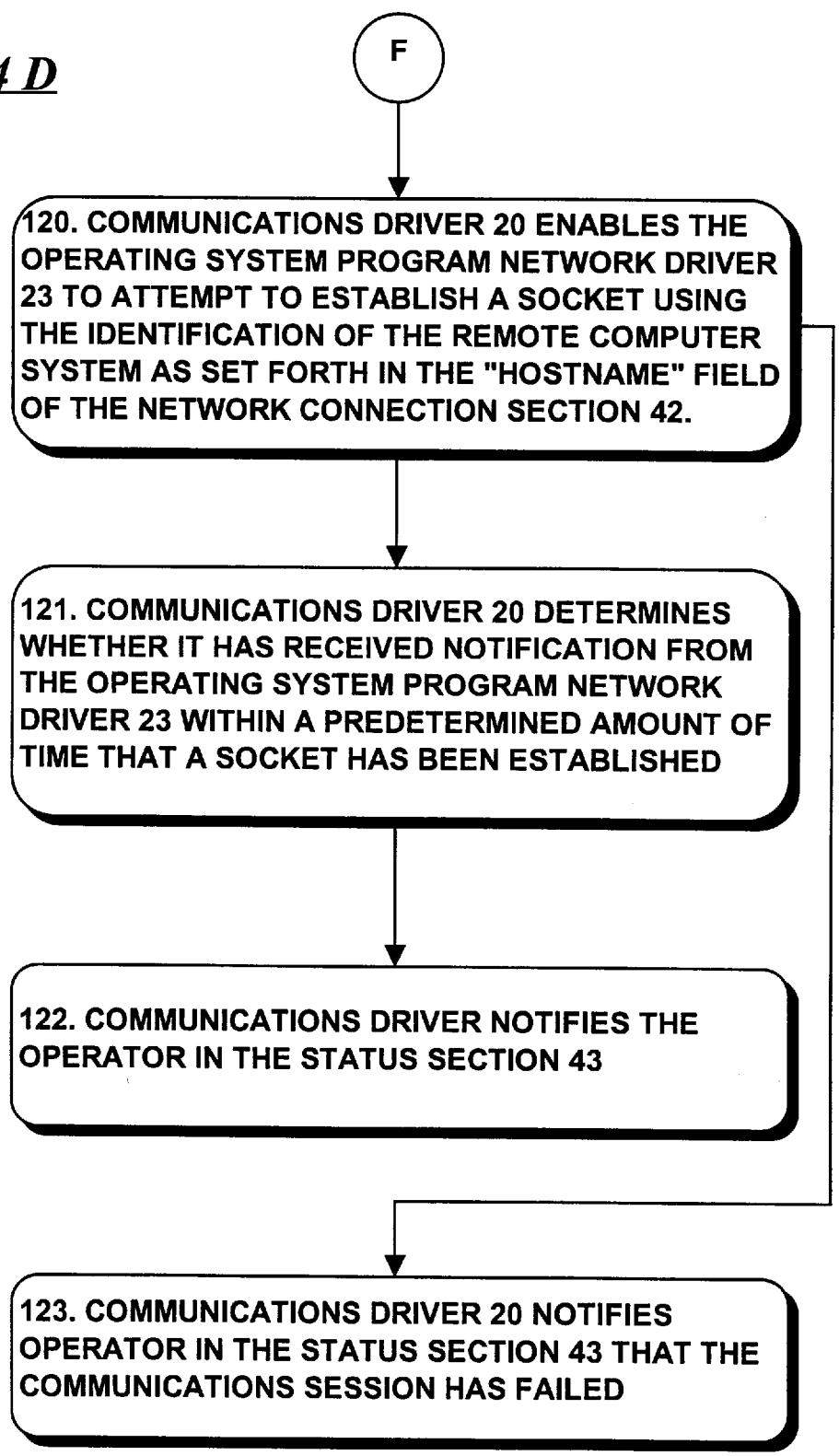

As noted above, when the operator initializes a terminal program which utilizes the communications driver 20, the communications driver 20 first displays a dialog box which the operator may use to select use of the network port 14 or the communications port 15 for communications. An illustration of such a dialog box is depicted in FIG. 3. With reference to FIG. 3, the dialog box 40 includes several sections, including a connection medium selection section 41, a network connection section 42, a status section 43 and a set of control pushbuttons generally identified by reference numeral 44. As is typical in dialog boxes provided in the Windows operating environment, the dialog box 40 also includes a title portion 45 which may identify the title of the communications driver 20.

The connection medium selection section 41 and network connection section 42 jointly provide mechanisms by which the operator may enter his or her communications media selection and, if the network port 14 is selected, the particular computer system with which communications is to take place. The connection medium selection section 41 includes a plurality of radio buttons, generally identified by reference numeral 46 which the operator may, using the mouse 12(*b*) in a conventional manner, select to, in turn, select either the network port 14 or communications port 15 as the communications medium. If the operator selects the communications port radio button, which is labeled "COMI" and energizes a "Connect" push-button 47, the communications driver 20 will direct communications through the communications path 24 (FIG. 2) as described above.

On the other hand, if the operator selects the network radio button, which is labeled "Network," and, after providing the information requested in the network connection section 42, energizes the "Connect" push-button 47, the communications driver 20 will direct communications through the network path 25 (FIG. 2), also as described above. The network connection section 42 allows the operator to provide information in the network connection section such as the computer system to participate in the communications session ("HOSTNAME"), a terminal type identifier ("TERMINAL TYPE") and a "NETWORK PORT" identifier which effectively identifies the application at the computer system to be processed in respective fields of the section 42. The communications driver 20 may display certain default information in the network connection section 42 fields showing pre-established values and settings for the operator's computer system 10, which it may obtain from an initialization file such as a Windows ".INI" file, which the operator may accept or change. After the operator energizes the Connect push-button 47 in connection with communications over the network path 25, the status section 43 will provide information regarding the status of the process used by the communications driver 20 in establishing the connection and socket to the computer system identified and applications program identified in the network connection section 42.

It will be appreciated that the operator may alternatively select and energize a Cancel push-button 50 or a Help push-button 51 in the control section 44. If the operator energizes the Cancel push-button 50, the communications driver 20 will return an error message to the applications program 21 being used by the operator. On the other hand, if the operator energizes the Help push-button 51, the communications driver 20 displays a help screen with information for the operator.

With this background, the detailed operations performed by the communications driver will be described in connection with the flow chart in FIG. 4. Preliminarily, the communications driver 20 will initially ensure that it is loaded by the Windows operating system program during operating system initialization ahead of any other communications driver; the purpose for this will be made clear below. During operation, and with reference to FIG. 4, when an operator initially calls an applications program 21 such as a terminal program and attempts to initiate communications using the API 19, the communications driver 20 will be called (step 100) and enabled to display the dialog box 40 described above in connection with FIG. 3 (step 101). In that operation, the communications driver 20 will determine from the selected initialization (".INI") file whether there is default information to be displayed in the dialog box 40 and, if so, uses that information in the display. After displaying the dialog box, the communications driver 20 will wait until the operator has entered the information in the connection medium selection section 41 and network connection section 42 and energized either the Connect push-button 47 or the Cancel push-button 50 (step 102).

If the operator selects the Cancel push-button 50, the communications driver 20 returns a termination code value to the applications program 21 through the API 19 (step 103). Thereafter, the applications program 21 can perform predetermined termination/recovery operations.

However, if the operator selects the Connect push button in step 102, the operations performed by the communications driver 20 will depend on the radio button 46 selected by the operator in the connection medium selection section 41 prior to energizing the Connect push-button 47, and so the communications driver 20 will initially determine which radio buttons was selected (step 104). If the communications driver 20 determines that the communications push button COMI is selected, it passes control to the operating system program communications driver 22 (step 105), which controls the virtual device driver 26 and communications port 15 in a conventional manner. Thereafter, the operating system program communications driver 22 will communicate directly with the applications program 21 to facilitate communications between the applications program 21 and the remote computer system over the communications port 15 through the communications path 24.

(In the Windows operating environment, the Windows operating system program on initialization loads all of the driver programs it will call successively in the sequence established in a system configuration file and, since, as noted above, the communications driver 20 ensures that is loaded ahead of any other communications driver which the operating system program may load, in passing control in step 105 it need merely pass control to the next communications driver loaded. If there are one or more driver programs between the communications driver 20 and the operating system program communications driver 22, the driver programs therebetween will determine that they are to pass control, until control is finally passed to the operating system program communications driver 22.)

On the other hand, if the communications driver 20 determines in step 104 that the operator had selected the Network radio button 46 in the connection medium selection section 41, proceed to a sequence, beginning with step 110 to will utilize the network path 25 to establish a socket to the computer system identified in the "HOSTNAME" field of the network connection section 42, if one does not already exist and establish communications with the computer system for the applications program 21. Initially, the communications driver 20 will, using the network socket driver 23, determine whether an appropriate socket exists (step 110). If it determines that a socket exists, it will proceed to step 111 to use the socket to enable the computer system to call and initialize the program corresponding to the network port value contained in the "NETWORK PORT" field of the network connect section 42. If the communications driver 20 receives a notification from the computer system over the socket within a predetermined period of time that it has called and initialized the program (step 112), it (the communications driver 20) will notify the operator in the status section 43 of successful completion (step 113), remove the dialog box (step 114) and allow communications to proceed between the applications program 21 and the remote computer system over the network path 25 (step 115). In those communications, information entered by the operator through the operator input devices 12 (FIG. 1) will be transferred in messages through the network port 14 to the remote computer system, and information defining video screen displays generated by the remote computer system will be received from the remote computer system through the network port for display by the video display device 13 to the operator.

Returning to step 112, if the communications driver 20 does not receive any notification from the computer system within a predetermined period of time, it (the communications driver 20) will notify the operator in the status section 43 that the communication has failed (step 116). The operator may then take whatever error recovery steps he or she deems necessary.

Returning to step 100, if the communications driver 20 determines in that step that no socket exists, it will proceed to a sequence beginning with step 120 to attempt to establish a socket. In that operation, the communications driver 20 will enable the network socket driver 23 to attempt to establish a socket (step 120) using the identification of the remote computer system as set forth in the "HOSTNAME" field of the network connection section 42. If the communications driver 20 receives a notification from the network socket driver 23 within a predetermined amount of time that a socket has been established (step 121), it will notify the operator in the status section 43 (step 122) and proceed to steps 111 through 115 described above to use the socket to attempt to enable the computer system to call and initialize the program corresponding to the network port value contained in the "NETWORK PORT" field of the network connect section 42, and, if the attempt is successful, proceed with communications. On the other hand, if the communications driver 20 in step 121 does not receive a notification from the network socket driver-23 within a predetermined period of time that the socket has been established, it (the communications driver 20) will notify the operator in the status section 43 that the communication has failed (step 123), to allow the operator to take whatever error recovery steps he or she deems necessary.

When the operator determines to end the communications session, the applications program 21 will so notify the communications driver 20. When the communications driver 20 receives such a notification (step 130), it enables the network socket driver 23 to destroy any data structures maintained for the communications session (step 131).

It will be appreciated that the communications driver 20 provides a number of advantages. In particular, it allows an operator to easily establish and maintain a communications session using his or her computer as a terminal with remote devices, such as computer systems, over a number of diverse types of communications media.

It will further be appreciated that a number of modifications may be made to the communications driver 20 as described above. For example, typically a computer system such as computer system 10 is provided with a number of the communications driver's initialization (".INI") file may identify a set of predetermined communications session types, each specifying one of the communications media and, if the network is specified, the remote computer system to be used for the session. In that case, if the operator specifies one of the predetermined communications session types when initiating a communications session through an applications program 21, the communications driver 20 will use that information in establishing the communications session instead of delaying the dialog box 30. In addition, although the communications driver 20 has been described as selectively initiating communications session in connection with a network port 14 and a communications port 15, it will be appreciated that it may be used in connection with a number of diverse types of ports and communications media.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. For use with a computer system including a plurality of ports connected to a number of diverse types of communications media, a communications driver for selectively establishing a communications session between the computer system operating as a terminal with a remote device over a selected one of said communications media using an associated one of said ports as selected by an operator, at least one of said ports comprising a network port controlled by a network socket driver, the communications driver including:

A. an operator medium selection element for enabling the computer system to, in turn, enable the operator to selectively identify either of said communications media and a remote device;

B. a communications path selection element for enabling the computer system to select one of said ports in response to the identification by the operator of one of said communications media and a remote device;

C. a communications session establishment element for enabling the computer system to establish a communications session with the remote device over the communications medium using the port as selected by the computer system in response to processing controlled by said communications path selection element; and D. a communications handling element for enabling the computer system to handle communications during the communications session, the communications handling element enabling the computer system to operate as a terminal for processing operations performed by the remote device.

2. A computer program product for use with a computer system including a plurality of ports connected to a number of diverse types of communications media, the computer program product comprising a computer readable medium including communications driver code devices for enabling the computer system to selectively establish a communications session between the computer system operating as a terminal with a remote device over a selected one of said communications media using an associated one of said ports as selected by an operator, at least one of said ports comprising a network port controlled by a network socket driver, the communications driver including:

A. operator medium selection code devices for enabling the computer system to, in turn, enable the operator to selectively identify either of said communications media and a remote device;

B. communications path selection code devices for enabling the computer system to select one of said ports in response to identification by the operator of one of said communications media and a remote device;

C. communications session establishment code devices for enabling the computer system to establish a communications session with the remote device over the communications medium using the port as selected by the computer system in response to processing controlled by said communications path selection code devices; and D. communications handling code devices for enabling the computer system to handle communications during the communications session, the communications handling code devices enabling the computer system to operate as a terminal for processing operations performed by the remote device.

3. A method of controlling a computer system including a plurality of ports connected to a number of diverse types of communications media, the method enabling the computer system to selectively establish a communications session between the computer system operating as a terminal with a remote device over a selected one of said communications media using an associated one of said ports as selected by an operator, at least one of said ports comprising a network port controlled by a network socket driver, the method comprising the steps of:

A. enabling the computer system to, in turn, enable the operator to identify either of said communications media and a remote device;

B. enabling the computer system to select one of said ports in response to identification by the operator of one of said communications media and a remote device;

C. enabling the computer system to establish a communications session with the remote device over the communications medium using the port as selected by the computer system; and D. enabling the computer system to handle communications during the communications session, the communications handling element enabling the computer system to operate as a terminal for processing operations performed by the remote device.

4. A computer system including a plurality of ports connected to a number of diverse types of communications media, at least one of said ports comprising a network port controlled by a network socket driver, the computer system including:

A. an operator medium selection element for enabling the operator to identify either of said communications media and a remote device;

B. a communications path selection element for selecting one of said ports in response to identification by the operator of one of said communications media and a remote device;

C. a communications session establishment element for establishing a communications session with the remote device over the communications medium using the port as selected by said communications path selection element; and D. a communications handling element for handling communications during the communications session whereby the computer system will operate as a terminal with processing operations performed by the remote device, thereby to enable the computer system to operate as a terminal for a remote device over a selected one of said communications media using an associated one of said ports as selected by an operator.

* * * * *